United States Patent
Berger

(10) Patent No.: US 10,822,006 B2
(45) Date of Patent: Nov. 3, 2020

(54) NETWORK CONNECTION OF VEHICLES

(71) Applicant: SIEMENS MOBILITY GMBH, Munich (DE)

(72) Inventor: Gisbert Berger, Berlin (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 16/468,057

(22) PCT Filed: Dec. 4, 2017

(86) PCT No.: PCT/EP2017/081284
§ 371 (c)(1),
(2) Date: Jun. 10, 2019

(87) PCT Pub. No.: WO2018/104192
PCT Pub. Date: Jun. 14, 2018

(65) Prior Publication Data
US 2020/0017133 A1 Jan. 16, 2020

(30) Foreign Application Priority Data
Dec. 9, 2016 (DE) .................. 10 2016 224 613

(51) Int. Cl.
*H04B 10/114* (2013.01)
*B61L 27/00* (2006.01)
(Continued)

(52) U.S. Cl.
CPC ...... *B61L 27/0005* (2013.01); *H04B 10/1143* (2013.01); *H04B 10/40* (2013.01);
(Continued)

(58) Field of Classification Search
CPC ............................................. H04B 10/11–116
(Continued)

(56) References Cited

U.S. PATENT DOCUMENTS 6,580,541 B1    6/2003  Yamashita et al.
8,188,878 B2 *  5/2012  Pederson ............... H04B 3/54
                                            340/815.45
(Continued)

FOREIGN PATENT DOCUMENTS

DE       69727562 T2    11/2004
DE     102013001358 A1   7/2014
(Continued)

OTHER PUBLICATIONS

Haruyama et al: "New Ground-to-Train High-Speed Free-Space Optical Communication System with Fast Handover Mechanism", Optical Fiber Communication Conference/National Fiber Optic Engineers Conference 2011.

*Primary Examiner* — Li Liu
(74) *Attorney, Agent, or Firm* — Laurence Greenberg; Werner Stemer; Ralph Locher

(57) ABSTRACT

A data transmission system for a track-bound transport system has a plurality of vehicle-mounted optical transmitting/receiving devices, or transceivers, on at least one vehicle. The devices are oriented perpendicular to the direction of travel towards both sides of the vehicle. Trackside-mounted stationary optical transceivers are arranged along a route to be travelled by the vehicle on the side of the travel route. The vehicle-mounted optical transceivers is configured to communicate at least with the trackside-mounted stationary optical transceiver positioned the closest thereto and to independently maintain separate communication links at as full a bandwidth as possible with one of the trackside-mounted stationary optical transceivers. There is also described a track-bound transport system and a method for transmitting data between a vehicle and a stationary network.

10 Claims, 3 Drawing Sheets

(51) Int. Cl.
    *H04B 10/40*            (2013.01)
    *H04B 10/548*         (2013.01)
    *H04B 10/80*            (2013.01)

(52) U.S. Cl.
    CPC ........... *H04B 10/548* (2013.01); *H04B 10/80* (2013.01); *B61L 2205/00* (2013.01)

(58) Field of Classification Search
    USPC .................................................. 398/118–131
    See application file for complete search history.

(56) References Cited

U.S. PATENT DOCUMENTS

| | | | | |
|---|---|---|---|---|
| 8,503,886 | B1 * | 8/2013 | Gunasekara | H04B 10/116 398/115 |
| 8,902,076 | B2 * | 12/2014 | Pederson | H04B 10/116 340/815.45 |
| 9,609,569 | B2 * | 3/2017 | Byers | H04W 36/32 |
| 9,810,531 | B2 | 11/2017 | Hua et al. | |
| 2004/0234268 | A1 * | 11/2004 | Olch | H04B 10/1149 398/118 |
| 2006/0056855 | A1 * | 3/2006 | Nakagawa | G09F 9/33 398/183 |
| 2008/0292320 | A1 * | 11/2008 | Pederson | H04B 10/1149 398/128 |
| 2009/0245805 | A1 * | 10/2009 | Akasaka | H04B 10/1125 398/128 |
| 2015/0086213 | A1 * | 3/2015 | Pederson | G07C 9/37 398/128 |
| 2015/0358080 | A1 * | 12/2015 | Hua | H04L 7/0075 398/107 |

FOREIGN PATENT DOCUMENTS

| | | |
|---|---|---|
| EP | 2056492 A1 | 5/2009 |
| JP | S6012832 A | 1/1985 |
| JP | H0263331 A | 3/1990 |
| WO | 2014195431 A1 | 12/2014 |

* cited by examiner

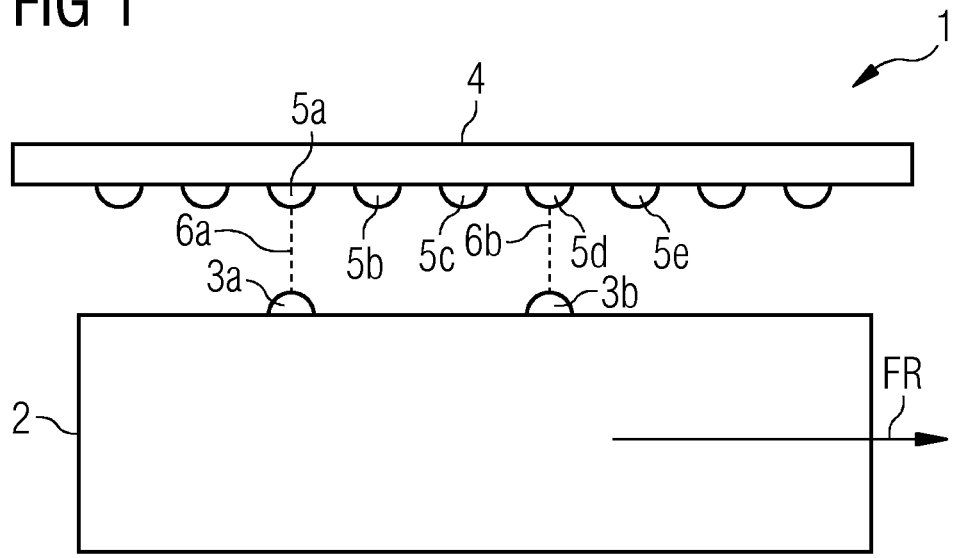
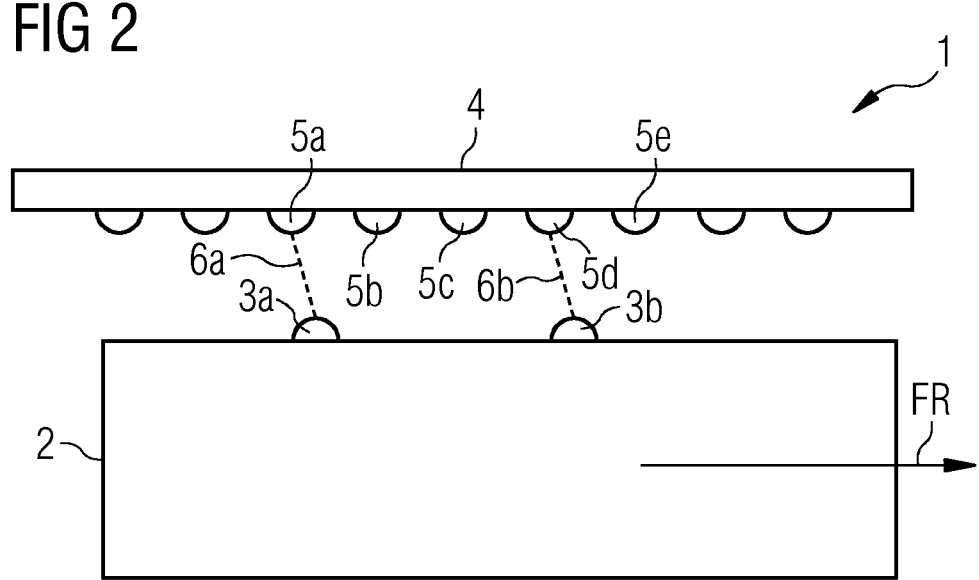

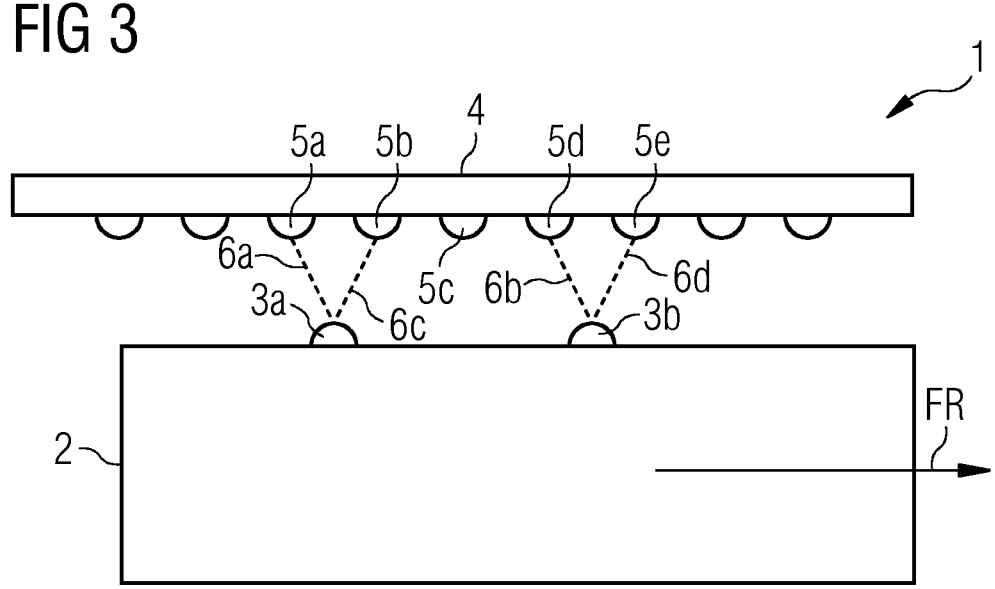
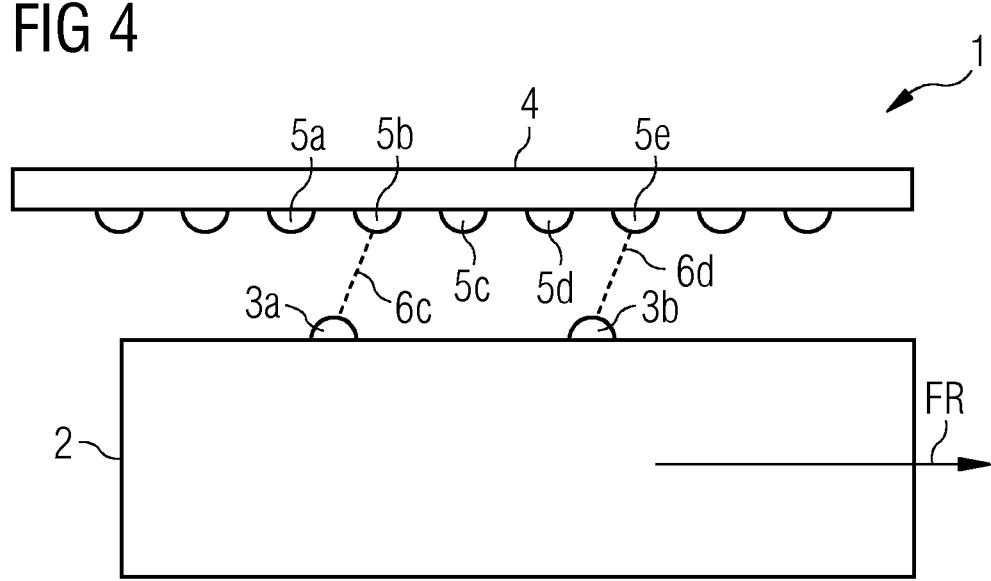

NETWORK CONNECTION OF VEHICLES

BACKGROUND OF THE INVENTION

Field of the Invention

The invention relates to a data transmission system. The invention further relates to a track-bound transport system. The invention moreover relates to a method for transmitting data between a vehicle and a stationary network.

Nowadays, passengers on public transport require communication services enabling them to access information and communicate with other people during their journey.

Most vehicles are nowadays provided with a network connection for communication with stationary or other mobile network subscribers. Such a network connection is required for the following tasks, for example:

- transmission of operational and traffic data from vehicles to stationary facilities,
- transmission of video and audio data from the interior of a vehicle or from external sensors to stationary units for assessment,
- transmission of alarm signals with or without additional multimedia data to stationary devices,
- provision of information with multimedia data that can only be transmitted by broadband data transmission, such as, for example, timetables, flight schedules, forecasts, for the passengers,
- high-bandwidth on-board internet for passengers and staff,
- broadband connections for audio and video telephony for operators and passengers, for example via the provision of VOIP connections,
- provision of multimedia content to passengers,
- use of cloud computing for the provision of computing resources to resolve problems in the vehicle, such as, for example, CCTV analyses, ADAS analyses, etc.

Problems arise in situations when the number of people in such a means of transport exceeds a maximum number so that the bandwidth of the communication network used is no longer sufficient. Particular bottlenecks arise especially in the case of rail-bound vehicles used for passenger transport since the much higher transportation capacity means particularly high bandwidths are required for the aforementioned tasks. With buses, the situation is somewhat more favorable since, due to the lower number of passengers transported, a much higher bandwidth is available for each passenger.

On the other hand, rail-bound mass transit means are the most suitable type of transport for on-board internet usage as they provide the best conditions for interference-free work. This is above all attributable to high running smoothness, adequate space, ideal working conditions with tables and a power supply and hardly any impairment due to travel sickness.

Currently, trains are connected to a stationary network via high-speed wireless connections. Even if individual cars have a separate radio connection to the network, the bandwidth is only insufficiently improved since, as a rule, the individual cars compete for the resources of the same radio cell of the stationary network.

HARUYAMA, Sh. et al.: New Ground-to-Train High-Speed Free-Space Optical Communication System with Fast Handover Mechanism. In: Optical Fiber Communication Conference and Exposition and the National Fiber Optic Engineers Conference 2011 describes a communication system with optical transmission between rail vehicles and stationary units.

EP 2 056 492 A1 describes a mobile optical communication system for rail vehicles, wherein communication units arranged on the underside of the rail vehicles interact with stationary communication units arranged in the track-bed.

DE 697 27 562 T2 describes an amphibious traveling vehicle controlled by means of light beam showers arranged on a route.

WO 2014/195 431 A1 describes a communication system for wireless data transmission between a mobile unit and a stationary communication device.

DE 10 2013 001 358 A1 describes a vehicle with transmitting/receiving modules, which communicate with light sources and light sensors which are arranged above the vehicle.

Thus, there is a problem of insufficient data transmission capacity in vehicles, in particular with larger numbers of passengers.

SUMMARY OF THE INVENTION

This object is achieved by a data transmission system as claimed, a track-bound transport system as claimed and a method for transmitting data between a vehicle and a stationary network as claimed.

The data transmission system according to the invention for a track-bound transport system comprising at least one vehicle has a plurality of vehicle-mounted optical transmitting/receiving devices on the at least one vehicle arranged adjacent to one another in the transverse direction with respect to the direction of travel and a plurality of track-mounted stationary optical transmitting/receiving devices arranged along a route to be traveled by the vehicle, on the side of the route. In this context, a track-bound transport system should be understood to be a transport system having firmly defined transport routes from which the vehicles do not deviate. Examples of this are road systems or rail systems. Herein, the plurality of vehicle-mounted optical transmitting/receiving devices is designed to communicate at least with the track-mounted stationary optical transmitting/receiving device positioned the closest thereto and independently to maintain separate communication links at as full a bandwidth as possible with one of the track-mounted stationary optical transmitting/receiving devices. In this context, optical data transmission should preferably be understood to be data transmission with light, wherein light is intended to include visible light and infrared light and ultraviolet light. For transmission, the light can, for example, be generated as directed light. Directed light should be understood to be a light beam or light cone with a certain directional restriction. The use of optical data transmission has the advantage that this type of data transmission enables a high data rate or bandwidth so that in particular multiple passengers are able to access a stationary network simultaneously. Advantageously, the fact that the vehicles are track-bound vehicles enables the stationary transmitting/receiving devices to be arranged at a short distance to the vehicle-mounted transmitting/receiving devices thus enabling optical data transmission over a short distance.

This enables the otherwise usual disruptions, caused, for example, by poor weather, particles or objects between the transmitter and receiver to be largely avoided. Optical data transmission also has the advantage that, in contrast to radio transmission, in the case of data transmission using a plurality of vehicle-mounted and/or stationary transmitting/receiving devices, no mutual interference between individual devices can occur if, as described, the light used for the data transmission has a certain directional restriction and thus light beams or light cones from different transmitters do not overlap. Alternatively, it is also possible to use non-directional light for the data transmission, wherein the data transmission range is restricted to a predetermined distance value. This also enables the transmitting/receiving devices to transmit data in parallel without mutual interference. Thus, parallel data transmission with a plurality of transmitting/receiving devices with no mutual interference when configured according to the invention enables the bandwidth to be still further increased.

If, for example, stationary optical transmitting/receiving devices are positioned on both sides of the vehicle at the edge of the track, the vehicle is able to communicate to both sides in parallel, wherein vehicle-mounted optical transmitting/receiving devices arranged next to each other in the transverse direction communicate toward different sides. This enables the communication bandwidth to be increased.

It is furthermore possible to achieve increased flexibility in the positioning of the track-mounted stationary optical transmitting/receiving devices.

The track-bound transport system according to the invention has at least one route on which track-bound vehicles travel and at least one data transmission system according to the invention.

With the method according to the invention, in a track-bound transport system, data is exchanged between a vehicle with a plurality of vehicle-mounted optical transmitting/receiving devices arranged adjacent to one another in the transverse direction with respect to the direction of travel and a plurality of track-mounted stationary optical transmitting/receiving devices arranged along a route to be traveled by the vehicle, on the side of the route, and connected to a network via a communication link. Herein, the plurality of vehicle-mounted optical transmitting/receiving devices communicates at least with the track-mounted stationary optical transmitting/receiving device positioned the closest thereto and independently maintains separate communication links at the respective full possible bandwidth with one of the track-mounted stationary optical transmitting/receiving devices. This means that the data transmission between the vehicle and a land-based data network takes place by optical data transmission via the optical transmitting/receiving devices positioned closest to each other. As already mentioned, this procedure achieves a higher bandwidth for the data transmission and a lower susceptibility to interference.

The dependent claims and the following description in each case contain particularly advantageous embodiments and developments of the invention. Herein, in particular the claims of one claims category can be also be developed analogously to the dependent claims of another claims category. In addition, within the context of the invention, the various features of different exemplary embodiments and claims can also be combined to form new exemplary embodiments.

In a preferred variant of the data transmission system according to the invention, the plurality of track-mounted stationary optical transmitting/receiving devices is designed to maintain an optical communication link with a vehicle-mounted optical transmitting/receiving device until a link is established between the next track-mounted stationary optical transmitting/receiving device in the direction of travel in each case and the vehicle-mounted optical transmitting/receiving device so that the vehicle-mounted optical transmitting/receiving device is constantly in connection with at least one track-mounted stationary optical transmitting/receiving device.

Thus, an uninterrupted communication link can be maintained between the vehicle and the land.

In one embodiment of the data transmission system according to the invention, the track-mounted stationary optical transmitting/receiving devices are spaced apart from the plurality of vehicle-mounted optical transmitting/receiving devices and from each other such that a constant connection to the at least one vehicle-mounted optical transmitting/receiving device is enabled. In this variant, the distances between at least one stationary and the at least one vehicle-mounted optical transmitting/receiving device are always sufficiently small that at least one communication link can be maintained between a stationary and the at least one vehicle-mounted optical transmitting/receiving device. Thus, a constant and seamless communication link can be maintained on the vehicle. Preferably, the stationary optical transmitting/receiving devices are also installed with sufficiently large distances from each other that parallel interference-free communication between adjacent stationary optical transmitting/receiving devices and vehicle-mounted optical transmitting/receiving devices is enabled.

In a preferred variant, the data transmission system according to the invention has a plurality of vehicle-mounted optical transmitting/receiving devices on a respective vehicle arranged in the longitudinal direction and designed independently to maintain separate communication links at as full a bandwidth as possible with one of the track-mounted stationary optical transmitting/receiving devices. The arrangement in the longitudinal direction enables parallel data transmission via a plurality of vehicle-mounted optical transmitting/receiving devices thus further increasing the achievable and attainable data transmission rate. With this type of parallel data transmission, several pairs of vehicle-mounted and track-mounted stationary transmitting/receiving devices arranged in each case opposite to each other communicate with each other at the same time. Particularly preferably, the individual vehicle-mounted optical transmitting/receiving devices are positioned on the vehicle such that a required signal-to-interference ratio is adhered to between the individual devices thus achieving interference-free parallel data transmission.

As mentioned, the data transmission system according to the invention has a plurality of vehicle-mounted optical transmitting/receiving devices on a respective vehicle arranged next to each other transverse to the direction of travel and designed independently to maintain separate communication links at as full a bandwidth as possible with one of the track-mounted stationary optical transmitting/receiving devices. If, for example, stationary optical transmitting/receiving devices are positioned on both sides of the vehicle at the edge of the track, the vehicle is able to communicate to both sides in parallel, wherein vehicle-mounted optical transmitting/receiving devices arranged next to each other in the transverse direction communicate toward different sides. This enables the communication bandwidth to be increased. It is furthermore possible to achieve increased flexibility in the positioning of the track-mounted stationary optical transmitting/receiving devices.

The parallel arrangements of the vehicle-mounted optical transmitting/receiving devices in the longitudinal direction and in the transverse direction can also be combined with each other in order in this way further to increase the bandwidth of the data transmission.

If adjacent transmitting/receiving devices operate with carrier signals with different optical wavelengths, this also enables minimal distances between transmitting/receiving devices to be further reduced since, for example, there is no mutual interference between two adjacent transmitting/receiving devices with different wavelengths during transmission.

In a preferred embodiment of the data transmission system according to the invention, the optical transmitting/receiving devices are designed to communicate with each other simultaneously via a plurality of different optical wavelengths as the carrier signal. This enables the bandwidth of the data transmission between the vehicle-mounted optical transmitting/receiving devices and the track-mounted stationary optical transmitting/receiving devices to be further increased.

In one embodiment of the data transmission system according to the invention, the optical transmitting/receiving devices are designed to communicate with each other via a plurality of different modulation frequencies per optical wavelength. This measure again serves to increase the bandwidth of the data transmission between the vehicle-mounted optical transmitting/receiving devices and the track-mounted stationary optical transmitting/receiving devices.

In one variant of the data transmission system according to the invention, the track-mounted optical transmitting/receiving devices are arranged on both sides of the route in the longitudinal direction at least partially overlapping and the vehicle-mounted transmitting/receiving devices are arranged on both sides of the respective vehicle. Such an arrangement enables a change of sides during the positioning of the track-mounted stationary optical transmitting/receiving devices, wherein the overlapping arrangement in an intermediate section achieves uninterrupted transition on the change of sides.

An advisable application of the data transmission system according to the invention can also be used to illuminate tunnels by means of corresponding stationary optical transmitting/receiving devices. Herein, it is possible for a comparatively small transmission bandwidth to be selected and it is sufficient for there to be only a few transmitting/receiving devices on the vehicle, which may be used for simplified maintenance of a conventional network link with a constant bandwidth.

In a special embodiment of the track-bound transport system according to the invention, the route comprises a rail system. With a rail system, the trajectory of the rail vehicles is defined exactly thus ensuring that the distances between the vehicle-mounted optical transmitting/receiving devices and the track-mounted stationary optical transmitting/receiving devices are also defined. Thus, stationary and mobile transmitting/receiving devices can be arranged at a very short distance from each other thus enabling environmental disturbances to be avoided.

BRIEF DESCRIPTION OF THE SEVERAL VIEWS OF THE DRAWING

The invention is explained again in more detail in the following with reference to the attached figures and with reference to exemplary embodiments. In the figures:

FIG. 1 shows a schematic top view of a data transmission system for a rail-bound transport system according to an exemplary embodiment of the invention, FIG. 2 shows the data transmission system illustrated in FIG. 1 at a later time, FIG. 3 shows the data transmission system illustrated in FIG. 1 and FIG. 2 at a still later time during the handover of a communication link between track-mounted stationary and vehicle-mounted transmitting/receiving devices, FIG. 4 shows the data transmission system shown in FIG. 1, FIG. 2 and FIG. 3 after the handover of a communication link between track-mounted stationary and vehicle-mounted transmitting/receiving devices.

DESCRIPTION OF THE INVENTION

Figure 5:
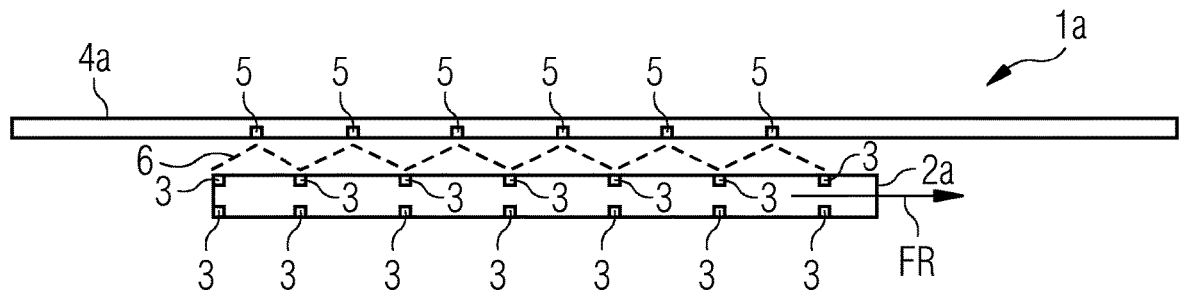
FIG. 5 shows a top view of a data transmission system with transmitting/receiving devices arranged on both sides during a phase of left-sided usage of the transmitting/receiving devices.

In FIG. 1 shows a data transmission system 1 for a rail-bound transport system according to an exemplary embodiment of the invention. A rail vehicle 2 moves in the direction of travel FR on a rail body (not shown). Arranged on the side of the rail vehicle 2, there are two vehicle-mounted optical transmitting/receiving devices 3a, 3b, in this exemplary embodiment on the left side, which serve to connect vehicle-mounted communication units to a stationary communication network, which, for example, provide a connection to the internet. Optical transmitting/receiving units have the advantage that they have a large bandwidth and hence a very high data transmission capacity. In this specific exemplary embodiment, the vehicle-mounted optical transmitting/receiving devices 3a, 3b are arranged one behind the other when viewed in the direction of travel. Arranged to the side of the route of the rail vehicle 2, in this case on the left side when viewed in the direction of travel, there is a carrier device 4 extending in parallel with the route that comprises a plurality of track-mounted stationary optical transmitting/receiving devices 5a, 5b, 5c, 5d, 5e connected to a stationary network (not shown), for example the internet and intended to establish a communication link between the rail vehicle 2 and the stationary network.

The rail-bound route of the rail vehicle 2 enables a distance between the vehicle-mounted optical transmitting/receiving devices 3a, 3b and the track-mounted stationary optical transmitting/receiving devices 5a, 5b, 5c, 5d, 5e to be defined exactly and to be very small. Thus, atmospheric disturbances are virtually unable to exert any influence on the transmitting/receiving quality and the required transmit powers can be low. Moreover, due to the defined position of rails and vehicle, alignments of transmitting/receiving devices with respect to each other are easy to define and monitor thus enabling interference-free communication to be achieved. Furthermore, it is possible to exclude the possibly of disruption to a rail system, for example due to dazzling of intersecting traffic. At the time shown in FIG. 1, a first vehicle-mounted optical transmitting/receiving device 3a maintains a first communication link 6a with a first track-mounted optical transmitting/receiving device 5a lying opposite to the first vehicle-mounted optical transmitting/receiving device. Furthermore, a second vehicle-mounted optical transmitting/receiving device 3b maintains a second communication link 6b with a second track-mounted optical transmitting/receiving device 5d lying opposite the second vehicle-mounted optical transmitting/receiving device 3b. Advantageously, with the arrangement of the vehicle-mounted optical transmitting/receiving devices 3a, 3b in the longitudinal direction selected in FIG. 1, data can be transmitted in parallel via both communication channels 6a, 6b thus enabling the technically inherent large bandwidth of individual communication channels to be further increased.

FIG. 2 is a sketch of the data transmission system 1 illustrated in FIG. 1 at a later time in which the rail vehicle 2 has moved forward by slightly less than a half distance between two track-mounted stationary optical transmitting/receiving devices. Both the first communication link 6a between the first vehicle-mounted optical transmitting/receiving device 3a and the first track-mounted optical transmitting/receiving device 5a and the second communication link 6b between the second vehicle-mounted optical transmitting/receiving device 3b and the second track-mounted optical transmitting/receiving device 5d still exist in this phase. However, now adjacent third and fourth track-mounted stationary optical transmitting/receiving devices 5b, 5e are now already within range of the first track-mounted optical transmitting/receiving device 5a or the second track-mounted optical transmitting/receiving device 5b.

FIG. 3 is a sketch of the data transmission system 1 illustrated in FIG. 1 and FIG. 2 at a time at which the rail vehicle 2 has moved forward by a half distance between two track-mounted stationary optical transmitting/receiving devices. In this situation, the first vehicle-mounted optical transmitting/receiving device 3a establishes an additional third communication link 6c with a third track-mounted stationary optical transmitting/receiving device 5b adjacent to the first track-mounted stationary optical transmitting/receiving device 5a while the first communication link 6a with the first track-mounted stationary optical transmitting/receiving device 5a is maintained. Similarly thereto, the second vehicle-mounted optical transmitting/receiving device 3b also establishes an additional fourth communication link 6d with a fourth track-mounted stationary optical transmitting/receiving device 5e adjacent to the second track-mounted stationary optical transmitting/receiving device 5d while during the second communication link 6b with the second track-mounted stationary optical transmitting/receiving device 5d is still maintained.

FIG. 4 is a sketch of the data transmission system 1 illustrated in FIG. 1, FIG. 2 and FIG. 3 at a time at which the rail vehicle 2 has moved forward by more than a half distance between two track-mounted stationary optical transmitting/receiving devices. At this time, now only the third communication link 6c between the first vehicle-mounted optical transmitting/receiving device 3a and the third track-mounted stationary optical transmitting/receiving device 5b and the fourth communication link 6d between the second vehicle-mounted optical transmitting/receiving device 3b and the fourth track-mounted stationary transmitting/receiving device 5e exist. On the other hand, the first communication link 6a between the first vehicle-mounted optical transmitting/receiving device 3a and the first track-mounted stationary optical transmitting/receiving device 5a and the second communication link 6b between the second vehicle-mounted optical transmitting/receiving device 3b and the second track-mounted stationary optical transmitting/receiving device 5d have already been terminated.

Thus, constant uninterrupted broadband data transmission between the vehicle 2 and the track-mounted network is always ensured.

Figure 6:
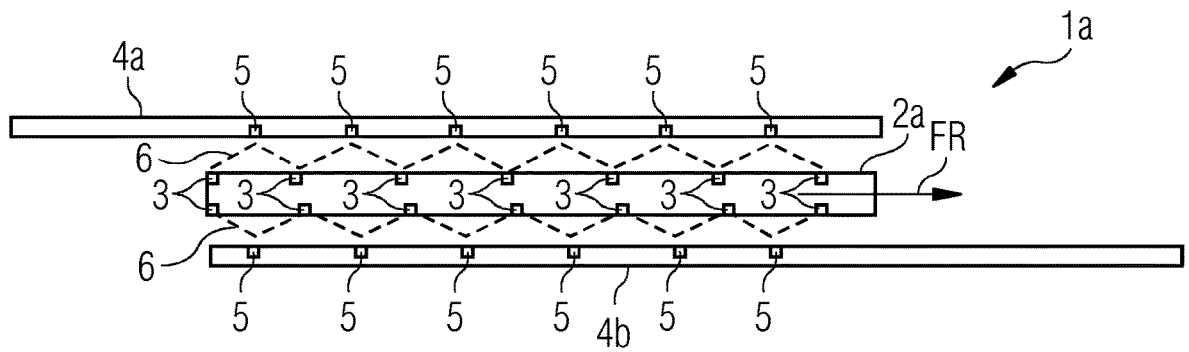
FIG. 6 shows a top view of the data transmission system shown in FIG. 5 during a phase of bilateral usage of the transmitting/receiving devices.
Figure 7:
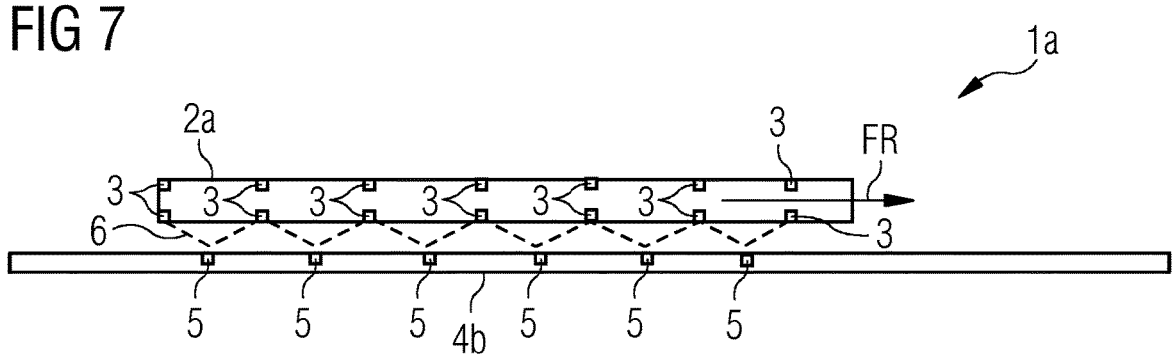
FIG. 7 shows a top view of the data transmission system shown in FIG. 5 and FIG. 6 during a phase of right-sided usage of the transmitting/receiving devices.

FIG. 5, FIG. 6 and FIG. 7 illustrate a data transmission system 1a according to a second exemplary embodiment of the invention. In contrast to the data transmission system 1 according to a first exemplary embodiment, the data transmission system 1a according to a second exemplary embodiment has track-mounted stationary optical transmitting/receiving devices 5 arranged in sections on the left side of the track 4a (see FIG. 5) and track-mounted stationary optical transmitting/receiving devices 5 arranged in sections on the right side of the track 4b (see FIG. 7). In a transitional section (see FIG. 6), the track-mounted optical transmitting/receiving devices 5 are arranged on both sides, thus enabling communication in both directions on passage through this transitional section. To this end, the rail vehicle 2a shown in FIG. 5, FIG. 6, FIG. 7 has vehicle-mounted optical transmitting/receiving devices 3 arranged on both side surfaces. Thus, interruption-free communication between the vehicle 2a and the stationary network is enabled.

Finally, reference is made once again to the fact that the methods and devices described above are only preferred exemplary embodiments of the invention and that the invention can be varied by the person skilled in the art without departing from the scope of the invention as specified in the claims. Thus, the method and the device are primarily explained in connection with the use of rail vehicles. However, the cited method and the described devices are not restricted to application with rail vehicles but may also be used in connection with other vehicles, such as, for example, road vehicles. For purposes of completeness, reference is also made to the fact that the use of the indefinite article "a" or "an" does not preclude the possibility of the features in question also being present on a multiple basis. Similarly, the term "unit" does not preclude the possibility of the unit consisting of a plurality of components, which could also be spatially distributed.

The invention claimed is:

1. A data transmission system for a track-bound transport system having at least one vehicle, the data transmission system comprising:
   a plurality of vehicle-mounted optical transceivers mounted laterally on the at least one vehicle on both sides of the vehicle and behind one another in a direction of travel of the vehicle;
   a plurality of trackside-mounted stationary optical transceivers, arranged along a route to be traveled by the vehicle, laterally of the route in sections on the left side of the route and in sections on the right side of the route, and in a transitional section the trackside-mounted stationary optical transceivers are arranged on both sides of the route and overlapping in the longitudinal direction,
   said plurality of vehicle-mounted optical transceivers being configured to communicate with a respective trackside-mounted stationary optical transceiver that is positioned closest thereto and independently to maintain separate communication links at as full a bandwidth as possible with one of said trackside-mounted stationary optical transceivers, and
   wherein in the transition section said vehicle-mounted optical transceivers on both sides of the vehicle communicate simultaneously with trackside-mounted stationary optical transceivers on both sides of the route.

2. The data transmission system as claimed in claim 1, wherein said plurality of trackside-mounted stationary optical transceivers are configured to maintain an optical communication link with a vehicle-mounted optical transceiver until a link is established between a next trackside-mounted stationary optical transceiver in the direction of travel and a respective vehicle-mounted optical transceiver so that the respective vehicle-mounted optical transceiver is constantly in connection with at least one trackside-mounted stationary optical transceiver.

3. The data transmission system according to claim 2, wherein said trackside-mounted stationary optical transceivers are spaced apart from said plurality of vehicle-mounted optical transceivers and from one another such that a constant connection to said at least one vehicle-mounted optical transceiver is enabled.

4. The data transmission system according to claim 1, wherein said plurality of vehicle-mounted optical transceivers on a respective vehicle are arranged in the longitudinal direction and configured independently to maintain separate communication links at as full a bandwidth as possible with one of said trackside-mounted stationary optical transceivers.

5. The data transmission system according to claim 1, wherein said vehicle-mounted optical transceivers and said trackside-mounted stationary optical transceivers are configured to communicate with one another via a plurality of different optical wavelengths.

6. The data transmission system according to claim 5, wherein said vehicle-mounted optical transceivers and said trackside-mounted stationary optical transceivers are configured to communicate with one another via a plurality of different modulation frequencies per each of the different optical wavelengths.

7. The data transmission system according to claim 1, wherein said vehicle-mounted optical transceivers and said trackside-mounted stationary optical transceivers are configured to communicate with one another via a plurality of different modulation frequencies.

8. A track-bound transport system, comprising:
 at least one route on which track-bound vehicles travel; and
 at least one data transmission system according to claim 1.

9. The track-bound transport system as claimed in claim 8, wherein the at least one route comprises a rail system.

10. A method of transmitting data between a vehicle and a stationary network in a track-bound transport system, the system including a plurality of vehicle-mounted optical transceivers laterally mounted on both sides of the vehicle and behind one another in a direction of travel and a plurality of trackside-mounted stationary optical transceivers arranged along a route to be traveled by the vehicle, laterally of the route in sections on the left side of the route and in sections on the right side of the route, and in a transitional section the trackside-mounted stationary optical transceivers are arranged on both sides of the route and overlapping in the longitudinal direction, and connected to the stationary network via a communication link, the method comprising:
 causing the plurality of vehicle-mounted optical transceivers to communicate with at least the trackside-mounted stationary optical transceiver that is positioned closest thereto and to independently maintain separate communication links at as full a bandwidth as possible with one of the trackside-mounted stationary optical transceivers, and
 wherein in the transition section said vehicle-mounted optical transceivers on both sides of the vehicle communicate simultaneously with trackside-mounted stationary optical transceivers on both sides of the route.

* * * * *